United States Patent
Clark et al.

(10) Patent No.: US 9,129,213 B2
(45) Date of Patent: *Sep. 8, 2015

(54) INNER PASSAGE RELEVANCY LAYER FOR LARGE INTAKE CASES IN A DEEP QUESTION ANSWERING SYSTEM

(71) Applicant: International Business Machines Corporation, Armonk, NY (US)

(72) Inventors: Adam T. Clark, Mantorville, MN (US); Jeffrey K. Huebert, Rochester, MN (US); John E. Petri, St. Charles, MN (US)

(73) Assignee: International Business Machines Corporation, Armonk, NY (US)

(*) Notice: Subject to any disclaimer, the term of this patent is extended or adjusted under 35 U.S.C. 154(b) by 266 days.

This patent is subject to a terminal disclaimer.

(21) Appl. No.: 13/826,292

(22) Filed: Mar. 14, 2013

(65) Prior Publication Data

US 2014/0258205 A1    Sep. 11, 2014

Related U.S. Application Data

(63) Continuation of application No. 13/793,052, filed on Mar. 11, 2013.

(51) Int. Cl.
*G06N 5/02* (2006.01)
*G06N 5/04* (2006.01)

(52) U.S. Cl.
CPC .................. *G06N 5/02* (2013.01); *G06N 5/025* (2013.01); *G06N 5/045* (2013.01)

(58) Field of Classification Search
CPC ............................... G06N 5/025; G06N 5/045
USPC ....................................................... 706/47, 55
See application file for complete search history.

(56) References Cited

U.S. PATENT DOCUMENTS

| | | | |
|---|---|---|---|
| 2002/0078090 | A1 | 6/2002 | Hwang et al. |
| 2008/0065603 | A1 | 3/2008 | Carlson et al. |
| 2008/0282153 | A1 | 11/2008 | Kindeberg et al. |

OTHER PUBLICATIONS

Epstein et al ("Making Watson fast" May/Jul. 2012).*
Sven Hartrumpf ("Semantic Decomposition for Question Answering" 2008).*
Rob High ("The Era of Cognitive Systems: An Inside Look at IBM Watson and How it Works" 2012).*
U.S. Appl. No. 13/793,052, entitled Inner Passage Relevancy Layer for Large Intake Cases in a Deep QA System, filed Mar. 11, 2013.

* cited by examiner

*Primary Examiner* — Lut Wong
(74) *Attorney, Agent, or Firm* — Patterson & Sheridan, LLP

(57) ABSTRACT

System, computer-implemented method, and computer program product to receive a case by a deep question answering system, identify a policy relevant in generating a response to the case, the policy containing a set of criteria used in generating the response to the case, produce, by a first annotator, of a set of annotators, one or more relevant passages of the case, compute a criteria score for a first criterion, of the set of criteria, based on the one or more relevant passages of the case, an determine that the first criterion is met by the case when the criteria score for the first criterion exceeds a predefined threshold.

8 Claims, 5 Drawing Sheets

500

QA APPLICATION 112

| INNER PASSAGE RELEVANCY LAYER 501 | | |
|---|---|---|
| ANNOTATORS 510 | SCORERS 520 | MERGER 530 |

FIG. 5

INNER PASSAGE RELEVANCY LAYER FOR LARGE INTAKE CASES IN A DEEP QUESTION ANSWERING SYSTEM

CROSS-REFERENCE TO RELATED APPLICATIONS

This application is a continuation of co-pending U.S. patent application Ser. No. 13/793,052, filed Mar. 11, 2013. The aforementioned related patent application is herein incorporated by reference in its entirety.

BACKGROUND

Embodiments disclosed herein relate to deep question answering systems. More specifically, embodiments disclosed herein relate to an inner passage relevancy layer for large intake cases in a deep question answering system.

In some use cases of a deep question answering (deep QA) systems, like IBM's Watson®, cases (or questions) and the passages being compared are often of dramatically different sizes. For example, in an insurance provider implementation, a corpus consisting of various medical insurance policies and guidelines may exist, which in turn consists of specific criteria corresponding to a given procedure. In order for a requested procedure to be approved by the insurance provider, the specific criteria must be met in accordance with the patient's clinical information (CI). The patient's CI often contains detailed history and description of present illness which can span several pages of text. The CI is essentially the question (also referred to as an intake case) sent to the deep QA system. To counteract the large intake case, the deep QA pipeline may turn the policy and guideline criteria into the "question," and the intake case into the supporting/refuting "passage." This allows the relatively short criteria to be the subject of deep analysis by the deep QA system. However, despite this switch, many scoring algorithms of the deep QA system still perform poorly (in terms of accuracy and computational performance). For example, a passage term match scorer attempts to match each term in the question by comparing it to each term in the passage. It then produces an overall score by totaling all the individual question term scores. If the intake case (i.e., the passage) is substantially larger than the criteria (i.e., the question), then the chances of every term in the criteria matching something in the intake case abnormally increases. The problem is exacerbated by a lack of focus in the question. In the insurance context, there are only three possible answers to an intake case—approve, deny, or refer to physician. It never makes sense to replace part of a criterion with any of these answers to form a hypothesis in the traditional sense. Embodiments disclosed herein propose a novel solution to this problem.

SUMMARY

Embodiments disclosed herein provide a system, computer-implemented method, and computer program product to receive a case by a deep question answering system, identify a policy relevant in generating a response to the case, the policy containing a set of criteria used in generating the response to the case, produce, by a first annotator, of a set of annotators, one or more relevant passages of the case, compute a criteria score for a first criterion, of the set of criteria, based on the one or more relevant passages of the case, an determine that the first criterion is met by the case when the criteria score for the first criterion exceeds a predefined threshold.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIG. 5 is a block diagram illustrating components of a deep question answering system for an inner passage relevancy layer for large intake cases, according to one embodiment disclosed herein.

DETAILED DESCRIPTION

Figure 1:
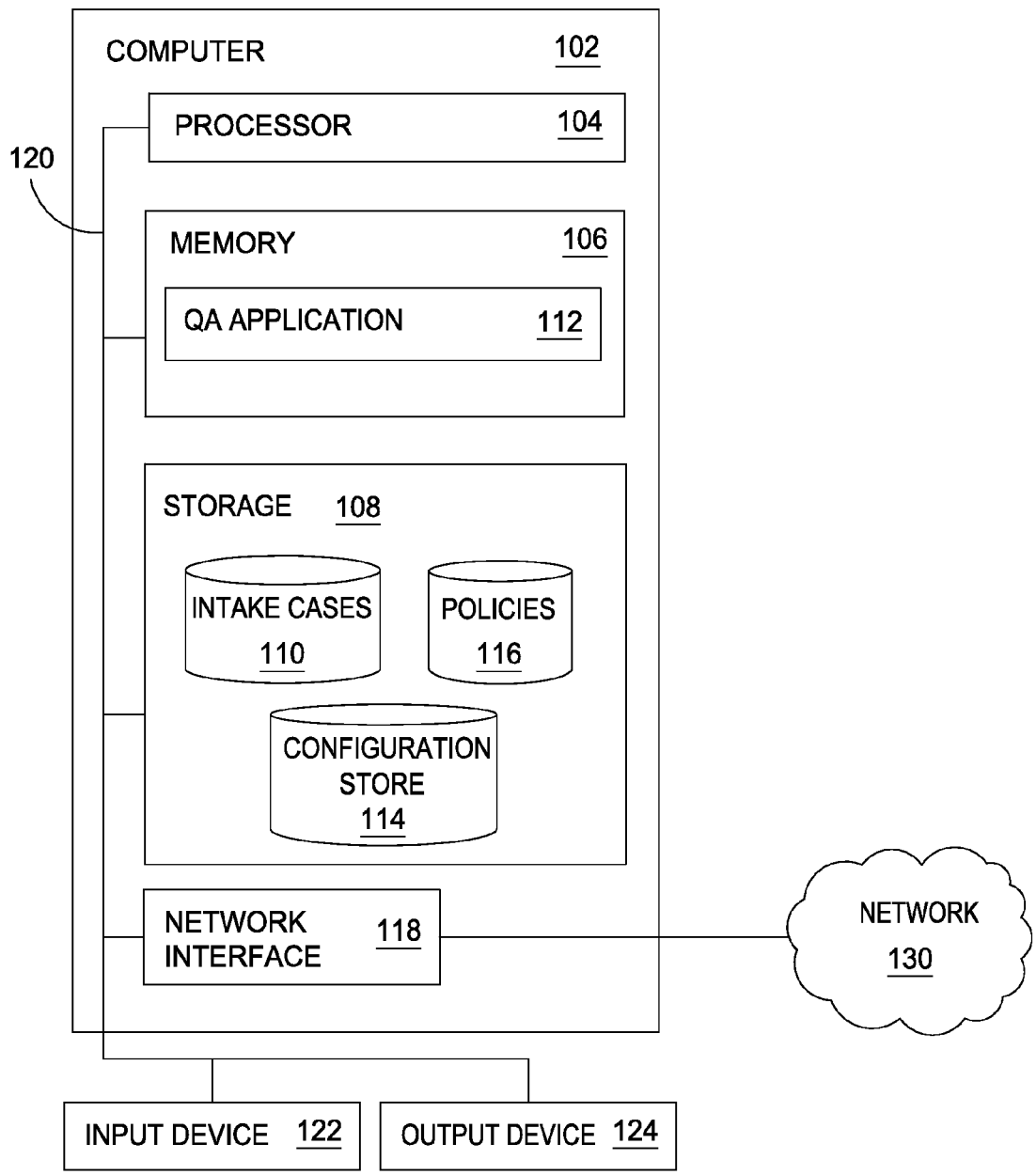
FIG. 1 is a block diagram illustrating a system for an inner passage relevancy layer for large intake cases in a deep question answering system, according to one embodiment disclosed herein.

Embodiments disclosed herein provide a deep question answering (deep QA) system which intelligently scopes a large intake case down to a more relevant subset of "inner passages" before performing deep analysis and scoring. The inner passage may be a textual portion of the intake case, or a concept identified from an analysis of the intake case. A configurable layer, referred to herein as the "inner passage relevancy layer," is provided to the deep QA system to accomplish this scoping. Several iterations within the inner passage relevancy layer may occur to iteratively subset the large passage based on a number of factors. Generally, the inner passage relevancy layer may be a configurable aggregate of annotators which reduces a size of the text of the intake case to identify the most relevant subset of inner passages, such that later scoring algorithms may operate on a smaller set of text. Additionally, each of the aggregate of annotators may produce a score for the passage it is currently processing. This approach may improve accuracy and computational performance when processing an intake case (question) in the deep QA system.

When processing a received intake case, the deep QA system first switches the intake case and the candidate criteria such that the criteria becomes the questions, and the large intake case becomes the supporting/refuting passage against which the questions (criteria) are analyzed. The inner passage relevancy layer may then be invoked to run against the larger supporting/refuting passage (the intake case) to identify the most relevant inner passages. Any number and combination of algorithms, annotators, and scorers may be provided in the inner passage relevancy layer to determine the subset. Furthermore, different annotators may be called in an iterative fashion to continually break down the passage based on a variety of factors. For example, some scorers may only be effective on text spanning one page or less. Others may only be effective on a single sentence. In some cases, the terms annotators and scorers may be used interchangeably. There may be some annotators that do not return scores.

The inner passage relevancy layer may be used to iteratively narrow down the intake case such that the final subset of inner passages is the most relevant for a target set of scorers (i.e., the deep analysis and scoring algorithms of a deep QA system). In one embodiment, one of the configured annotators attempts to determine a "focus" from the criteria. This may be a way to focus in on what may be the most critical areas of the criteria. As noted below, keyword searching may provide relevancy as well, but it does not take into account syntactic or semantic relationships in the criteria as the custom subset can. Generally, the aggregate of annotators may be modified and tailored to the nature of the question.

Additionally, the identified inner passages may be merged before invoking deep analysis and scoring. The decision to invoke a merger may be based on a number of criteria, including, but not limited to merging passages based on proximity or type. Explicit configuration or machine learning may be implemented to aid in the merger determination. Advantageously, inner passages from completely different parts of the intake case may be combined to improve accuracy for some scorers, as opposed to scoring each inner passage separately.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a deep question answering system or related data available in the cloud. For example, the deep question answering system could execute on a computing system in the cloud and provide an inner passage relevancy layer for large intake cases. In such a case, the deep question answering system could focus large intake passages and store merged inner passages at a storage location in the cloud. Doing so allows a user to access this information from any computing system attached to a network connected to the cloud (e.g., the Internet).

FIG. 1 is a block diagram illustrating a system 100 for an inner passage relevancy layer for large intake cases in a deep question answering system, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

As shown, the memory 106 contains the QA application 112, which is an application generally configured to operate a deep question answering (QA) system. One example of a deep question answering system is Watson, by the IBM Corporation of Armonk, N.Y. A user may submit a case (also referred to as a question) to the QA application 112, which will then provide an answer to the case based on an analysis of a corpus of information. The QA application 112 may analyze the questions presented in the case to identify concepts in the question. Based on the questions, the QA application 112 may identify a number of candidate answers. The QA application 112 may then find supporting evidence for the candidate answers. The QA application 112 may then score and rank the candidate answers, merge the results, and present the best answer as its response to the case.

Additionally, the QA application 112 may provide an inner passage relevancy layer (not shown), which is a component of the QA application 112 that is used to optimize the processing of large intake cases. A large intake case may be, but is not limited to, patient clinical information submitted for analysis under an insurance policy. Any large intake case is contemplated by the disclosure, and the use of patient clinical information and the insurance context is merely for explanation purposes, and should not be considered limiting of the disclosure. In processing the large intake case of clinical information, the QA application 112 may modify its execution pipeline, such that the intake case becomes the candidate answer (also referred to as a supporting or refuting passage), and the insurance policy (and its criteria) become the questions. In such an embodiment, the policy criteria are analyzed against the lengthier policy to improve processing time and performance by the QA application 112. The inner passage relevancy layer may comprise a configurable aggregate of annotators, which is run against the supporting/refuting passages to identify the most relevant subset of "inner" passages of the intake case (the patient's clinical information). Any number of algorithms may be employed or combined to determine the subset. The configuration of annotators and scorers in the inner passage relevancy layer may be predefined, or set by a user of QA application 112.

As shown, storage 108 contains a set of intake cases 110, which provides a storage location for the intake cases processed by the QA application 112. The storage 108 also contains a configuration store 114, which may be used to hold configuration information for the inner passage relevancy layer of the QA application 112. For example, the configuration store 114 may include a plurality of different aggregate of annotators and scorers, which may be tailored to process specific types of questions received by the QA application 112, or may be for all types of cases. In addition, the configuration information 114 may include information about the plurality of scorers used by the QA application 112, such a maximum or optimal text size against which the scorers can run. For example, one scorer may only be effective on text spanning one page or less; another may only be effective on a single sentence of text. By storing this information, the QA application 112 may make determinations through the inner passage relevancy layer which allow it to continue to scope the intake case down to a more manageable size. The storage 108 may also contain a policies 116, which is a data store configured to hold a plurality of insurance policies containing any number of criteria, terms, and definitions. Although depicted as a database, the intake cases 110, configuration store 114, and policies 116 may take any form sufficient to store data, including text files, xml data files, and the like. Although depicted as residing on the same computer, any combination of the QA application 112, intake cases 110, configuration store 114, and policies 116 may reside on the same or different computers.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

Figure 2:
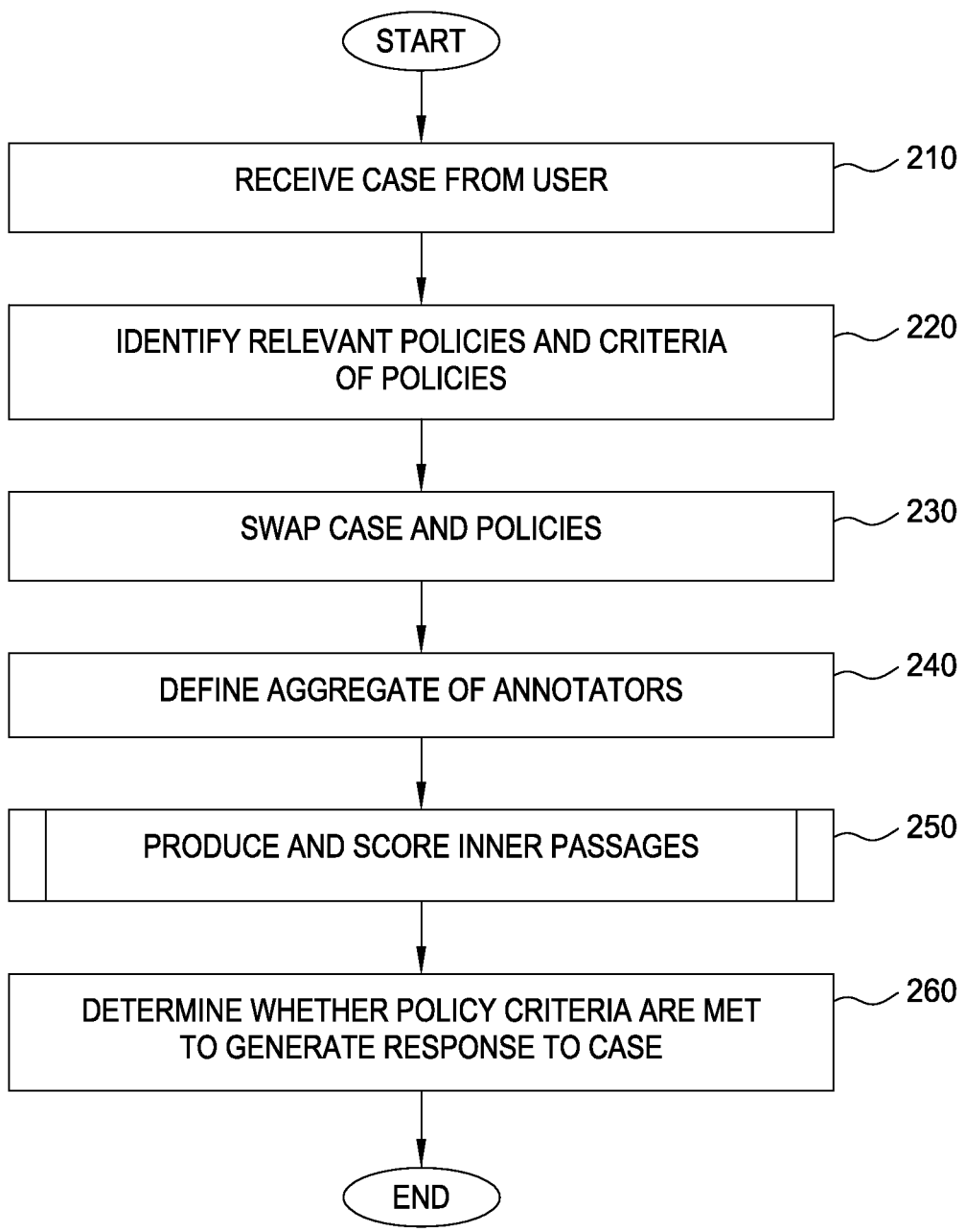
FIG. 2 is a flow chart illustrating a method for an inner passage relevancy layer for large intake cases in a deep question answering system, according to one embodiment disclosed herein.

FIG. 2 is a flow chart illustrating a method 200 for an inner passage relevancy layer for large intake cases in a deep question answering system, according to one embodiment disclosed herein. Generally, the steps of the method 200 allow the QA application 112 to intelligently scope a large intake case down to a more relevant subset of inner passages before performing deep analysis and scoring. In one embodiment, the QA application 112, or a designated component thereof, performs the steps of the method 200. At step 210, the QA application 112 receives an intake case from a user. In one embodiment, the intake case includes a patient's clinical information, which may be analyzed by the QA application 112 to determine whether a medical procedure is medically necessary. The intake case may be very lengthy, containing dozens of pages of detailed information, which may not be easily processed by many scorers commonly used by QA application 112. At step 220, the QA application 112 identifies a relevant insurance policy based on the received case. The policies may be stored in the policies 116, and may include a plurality of different criteria. The policy may be determined to be relevant based on an association with the patient, all patients, the procedure, or any other attribute. The policy may include a plurality of different criteria which must be met by the patient's clinical information in order for a procedure to be identified as medically necessary. For example, the policy criteria may require that a patient be a male non-smoker with a BMI (body mass index) under 25. Any criteria may be listed, and any number of different policies may be used for a single patient's clinical information to determine whether a procedure is medically necessary. The QA application 112 may break the policy criteria into a plurality of different atomic criteria which must be met in order to approve the medical procedure.

At step 230, the QA application 112 swaps the policy and the policy criteria for analysis purposes. The criteria would then be considered as the "question," and the intake case becomes the candidate answer. For example, the question, coming from the policy criteria, may be considered to be "is the patient a male?" The QA application 112 may then perform an analysis of the question to determine whether the policy criterion is met, i.e., whether patient is a male. A plurality of more complex criteria may be provided in a similar fashion, such as whether the patient is at an elevated risk for diabetes. The criteria described herein are for illustrative purposes, and should not be considered limiting of the disclosure. At step 240, the QA application 112 may identify an aggregate of annotators which may be used to parse the large intake case into a number of more relevant inner passages. The annotators may be selected so as to determine a focus from the criteria that include the most critical areas of the criteria. The annotators may be selected and ordered based on any number of criteria, such as the type, length, format, or subject matter of the insurance policy or the intake case. For example, if the question included a series of dates, the aggregate may include annotators that contain logic for calculating durations such that relevant inner passages are not missed. Alternatively, for performance reasons, a simpler (or broader) annotator may first narrow the set to a reasonable size, then subsequently run specialized annotators to further narrow the intake case. The aggregate of annotators may be predefined, or provided by a user.

At step 250, described in greater detail with reference to FIG. 3, the QA application 112 may produce and score the inner passages. At step 260, the QA application 112 determines whether each policy criterion is met, such that a response to the intake case may be produced by further processing. For example, using the above criteria, at step 260, the QA application 112 may determine that the patient is a male smoker with a BMI of 26, and determine that the procedure is not medically necessary because not all of the criteria have been met.

Figure 3:
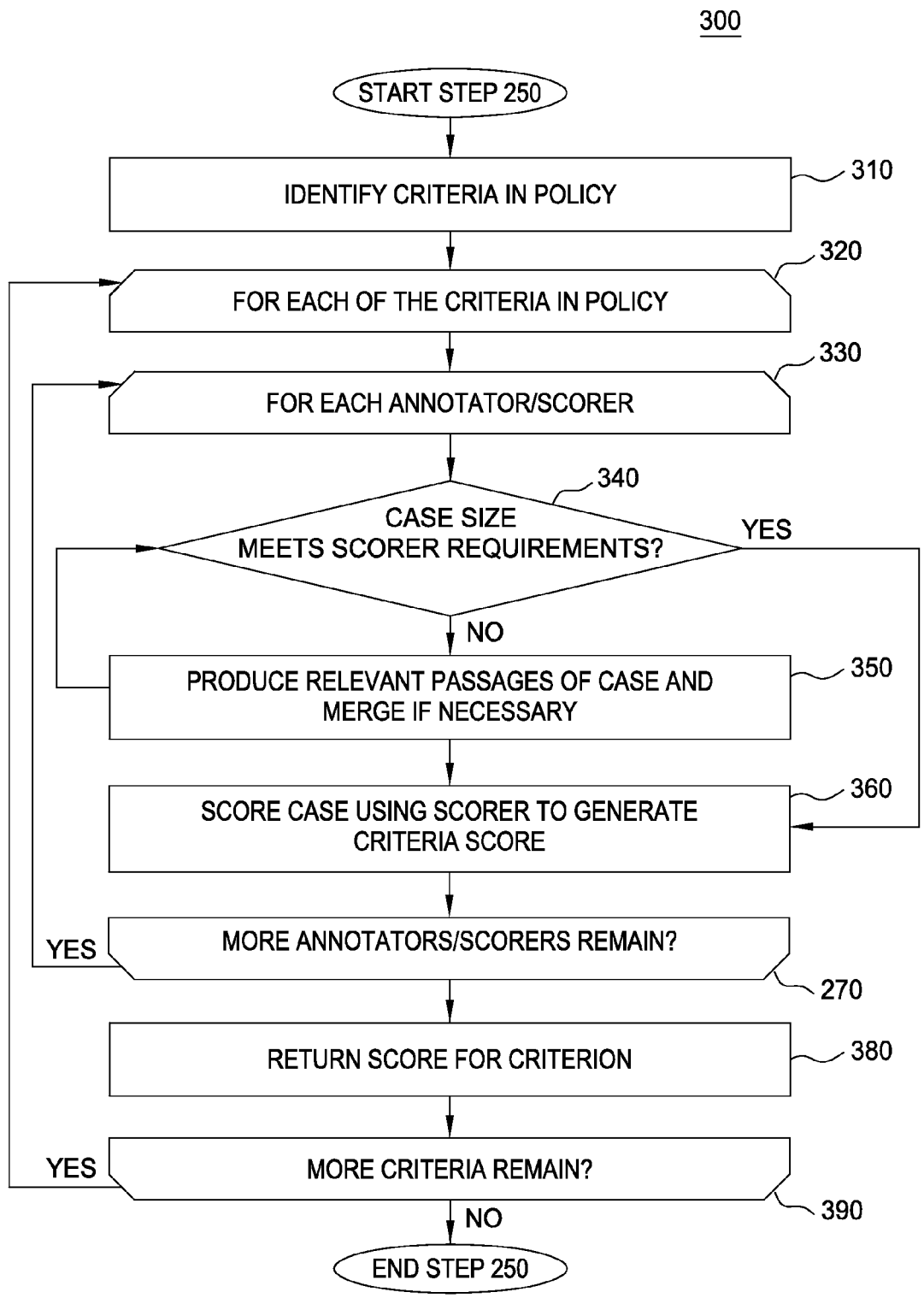
FIG. 3 is a flow chart illustrating a method to produce and score inner passages, according to one embodiment disclosed herein

FIG. 3 is a flow chart illustrating a method 300 corresponding to step 250 to produce and score inner passages, according to one embodiment disclosed herein. In one embodiment, the QA application 112, or a designated component thereof, performs the steps of the method 200. Generally, the steps of the method 300 allow the QA application 112 to narrow a large intake case through a series of annotators. The narrowed case may then be scored by different scorers, whose optimal input sizes are now met by the narrowed intake case. Although depicted as occurring recursively, the method 300 depicts one embodiment disclosed herein. Other embodiments include single, iterative calls to the method 300, which may occur one, several, or many times. Additionally, a call to a different scorer may not be made in each iteration of the method 300. For example, if an optimal text input size of a scorer is not met by the current length of the intake case, the QA application 112 may continue to narrow the intake case using different annotators in the aggregate of annotators, or may simply exit the method 300 based on a number of different factors. In one embodiment, the steps of the method 300 invoke the inner passage relevancy layer of the QA application 112.

At step 310, the QA application 112 identifies criteria in the policy, which may have been completed at step 220 and stored in the policies 116. As indicated above, the policy may contain any number of criteria, such as that the patient be a male non-smoker with a BMI under 25. The QA application 112 may process each criterion against the intake case to determine whether the patient's clinical information meets the criteria. At step 320, the QA application 112 begins executing a loop containing steps 330-390 for each of the criteria in the policy. At step 330, the QA application 112 begins executing a loop containing steps 340-370 for each annotator and scorer in the aggregate of annotators and the scorers used by the QA application 112. In one embodiment, the aggregate of annotators and the scorers, along with additional information regarding the same, may be stored in and retrieved from the configuration store 114. At step 340, the QA application 112 determines whether the case size meets scorer requirements. If the size meets the requirements, as defined for each scorer in the configuration store 114, the QA application 112 proceeds to step 360. Otherwise, the QA application 112 proceeds to step 350. At step 350, the QA application 112 produces relevant passages of the intake case and merges the resulting passages if necessary. The inner passages may be produced by the operation of annotators which have processed the intake case using a predefined algorithm to produce a specific output. For example, one annotator may be configured to ignore certain sections by removing unnecessary background and header information from the intake case, producing an output containing only the patient's detailed history information. Another annotator may take this output and identify and concentrate key concepts, producing a new inner passage with concentrated key concepts. At step 360, the QA application 112 scores the intake case for the criterion to generate a criteria score. The criteria score indicates a level of confidence that the criterion is met by the patient's CI as indicated in the intake case. The criteria score may be specific to a scorer used by the QA application 112, or it may reflect a composite score computed from the individual scores generated by a number of different scorers. Furthermore, the criteria score may be weighted based on the number of scorers actually used by the QA application 112 in computing the criteria score. For example, if only 1 of 3 scorers were used, the criteria score may be weighted down to reflect that not all scorers in the aggregate were used.

At step 370, the QA application 112 determines whether more annotators or scorers remain. If more annotators remain, the QA application 112 returns to step 330. In one embodiment, although additional scorers or annotators remain, the QA application 112 may make the determination to cease further processing of the current criteria based on any number of attributes of the intake case, annotators, or scorers, such as a size of the intake case being too large to be processed by any additional scorers, as there are no remaining annotators to run, or because a perfect score was reached by one scorer, or if a time limit was exceeded. Otherwise, the QA application 112 proceeds to step 380, where it returns the criteria score for the current criterion. At step 390, the QA application 112 determines whether more criteria remain to be processed. If more criteria remain, the QA application 112 returns to step 320. Otherwise, the method 300 ends.

Figure 4A:
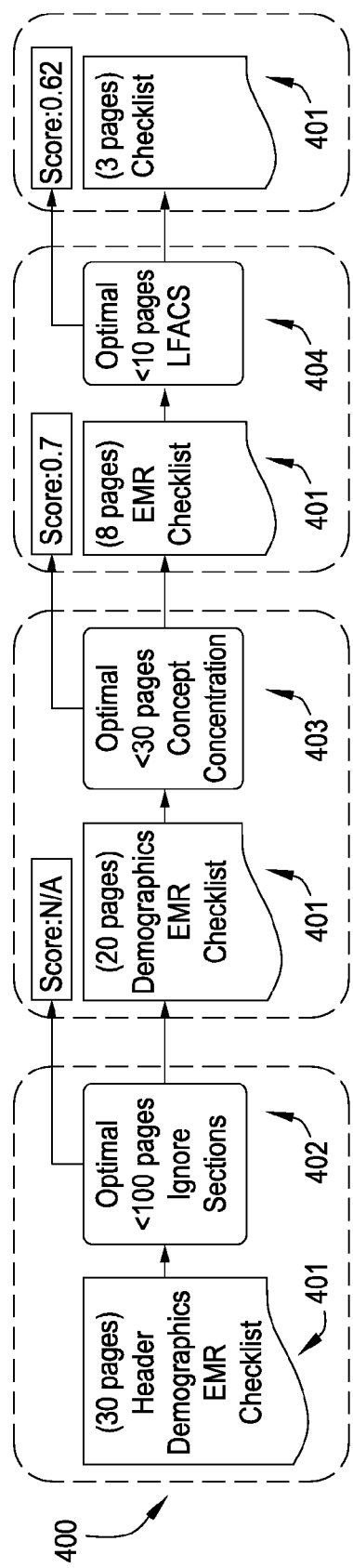
FIGS. 4A-B are block diagrams illustrating processing an intake case using an inner passage relevancy layer of a deep question answering system, according to one embodiment disclosed herein.
Figure 4B:
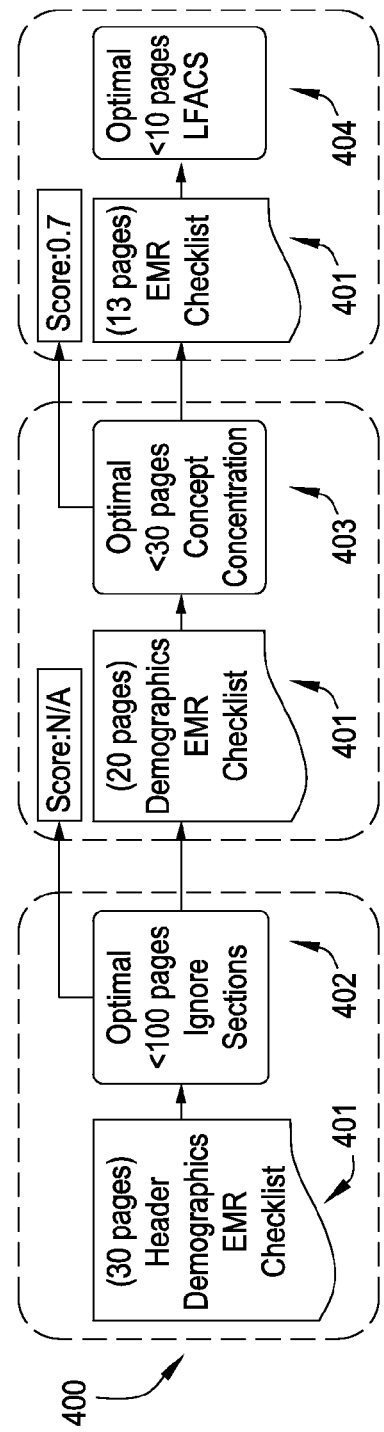

FIG. 4A is a block diagram 400 illustrating the processing of an intake case using an inner passage relevancy layer of a deep question answering system, according to one embodiment disclosed herein. The page size limitations and sections likely to be removed explained with reference to FIG. 4A-B are exemplary, and should not be considered limiting of the disclosure. As shown, intake case 401 reflects a 30-page intake case having four distinct sections, "Header," "Demographics," "EMR," and "Checklist." In a first iteration through the inner passage relevancy layer, depicted at block 402, the "Ignore Sections" annotator is used to reduce the size of the text, as the 30-page length of the intake case is too large for any of the scorers to be efficient. Once "Ignore Sections" is run (no score is produced by this algorithm), the intake case now is 20 pages long, and no longer has the "Header" section. With less than 30 pages, the intake case 401 is processed in a subsequent iteration by "Concept Concentration" 403, which is a broad text concept annotator optimized for text under 30 pages in length. Concept Concentration 403 produces a score of 0.7 (on a scale from 0 to 1, with 1 indicating the strongest probability that the criterion is present in the intake case), and reduces the size of the intake case 401 to 8 pages. Since the intake case 401 is now 8 pages long, LFACS 404 may now be run, which produces a score of 0.62 and a 3 page intake case 401. LFACS (Logical Form Answer Candidate Scorer) is a more intensive process for passage matching, which is optimized on text sizes under 10 pages. Once LFACS has run, there are no more remaining annotators in the aggregate, and the inner passage relevancy layer is not called again. The resulting scores of 0.7 and 0.62 may be returned as the scores for the criteria. Rather than allowing the two annotators to return scores, a single score may be generated per iteration or execution of the inner passage relevancy layer (all iterations), allowing one consistent value to be returned, regardless of the number of annotators executed. To create the single score, the two scores may be weighted and combined, averaged, or the like. Any suitable scoring mechanism and range may be used by the QA application 112 to generate criteria scores.

FIG. 4B is a block diagram 400 illustrating the processing of an intake case using an inner passage relevancy layer of a deep question answering system, according to one embodiment disclosed herein. In this example, the same intake case 401 having a length of 30 pages is provided to the inner passage relevancy layer. Again, after being processed by Ignore Sections 402, the intake case 401 is now 30 pages, and again processed by Concept Concentration 403. Concept Concentration returns a score of 0.7, and results in an intake case 401 having a length of 13 pages. However, this size is too large for LFACS to run efficiently. Therefore, the QA application 112 exits the loop, and returns only a single score of 0.7 from Concept Concentration, as the criteria score for a specific criterion.

FIG. 5 is a block diagram 500 illustrating components of the deep question answering system 112 for an inner passage relevancy layer for large intake cases, according to one embodiment disclosed herein. As shown, the QA application 112 has an inner passage relevancy layer 501 that is used to narrow a focus of a large intake case and detect the presence of different criteria in the intake case. The inner passage relevancy layer 501 may be called multiple times. Each time it is invoked, it may produce a criteria score as well as a set of inner passages. In some cases, more iterations may be preferable to obtain additional scores, whereas in other cases it may be sufficient to return early in order to save time. The inner passage relevancy layer 501 contains logic relating to annotators 510, scorers 520, and merger 530. The annotators 510 and scorers 520 include a plurality of different annotators which are used to reduce the text length of the intake case, and detect the presence of different policy criteria within the intake case. The scorers 520 may be annotators 510, but not all annotators 510 produce scores (such as the Ignore Sections annotator used in FIGS. 4A-B). The inner passage relevancy layer 501 may include an aggregate of annotators 510 and scorers 520, which may be stored in the configuration data 114, which specifies the order of annotators and scorers in the aggregate, as well as optimal size and other attributes. Merger 530 may contain logic which is used to determine when the output of an annotator (or scorer) should be merged to produce a set of merged inner passages. For example, passages may be merged based on proximity or type. Explicit configuration or machine learning may be used to make the determination as to whether merger should occur. If the inner passage relevancy layer 501 performs multiple iterations, the set of merged inner passages may be passed to the inner passage relevancy layer 501 for additional processing by the annotators 510 and scorers 520.

Advantageously, important characteristics of a large intake case are identified by the inner passage relevancy layer 501. For example, items not expressly represented as key words, such as calculated attributes like durations and dates which may span across different sections in a large intake case, may be detected. Embodiments disclosed herein therefore provide full control over subset selection. For example, combined with the ability to classify the type of large passage being scored, embodiments disclosed herein could identify completely different subsets of passages based on type. Embodiments disclosed herein achieve these advantages without sacrificing accuracy or computational performance.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
    receiving a case by a question answering system;
    identifying a policy relevant in generating a response to the case, wherein the policy contains a set of criteria used in generating the response to the case;
    swapping, in the question answering system, the case and the policy, wherein the policy becomes the case, wherein the case becomes a candidate answer for the policy;
    producing, by operation of one or more computer processors and by a first annotator selected from a predefined set of annotators, one or more relevant passages of the candidate answer;
    computing a criteria score for a first criterion, of the set of criteria, based on the one or more relevant passages of the candidate answer; and
    determining that the first criterion is met by the candidate answer when the criteria score for the first criterion exceeds a predefined threshold.

2. The computer-implemented method of claim 1, further comprising:
    prior to computing the criteria score, merging the one or more relevant passages of the candidate answer to create a first updated candidate answer; and
    scoring, by a first scorer, the first updated candidate answer to compute the criteria score for the first criterion.

3. The computer-implemented method of claim 2, wherein a size of a text of the received case is too large to be processed by the first scorer, wherein the one or more relevant passages of the candidate answer are produced to allow the question answering system to score the candidate answer with the first scorer.

4. The computer-implemented method of claim 2, further comprising:
    processing the first updated candidate answer by a second annotator, of the set of annotators, to produce an updated one or more relevant passages of the candidate answer;
    merging the updated one or more relevant passages of the candidate answer to create a second updated candidate answer; and
    scoring, by a second scorer, the second updated candidate answer to update the criteria score for the first criterion.

5. The computer-implemented method of claim 2, further comprising:
    adjusting the criteria score for the first criterion based on a confidence score of the first scorer, wherein the confidence score for the first annotator indicates a level of confidence in the criteria score produced by the first scorer.

6. The computer-implemented method of claim 1, wherein the received case and the policy are swapped to improve performance of the deep question answering system.

7. The computer-implemented method of claim 6, wherein the first criterion comprises a concept, wherein the criteria score is based on whether the concept is detected in the candidate answer.

8. The computer-implemented method of claim 1, wherein the one or more relevant passages comprises a subset of the text of the candidate answer deemed relevant in determining whether the first criterion is met by the candidate answer.

* * * * *